UNITED STATES PATENT OFFICE.

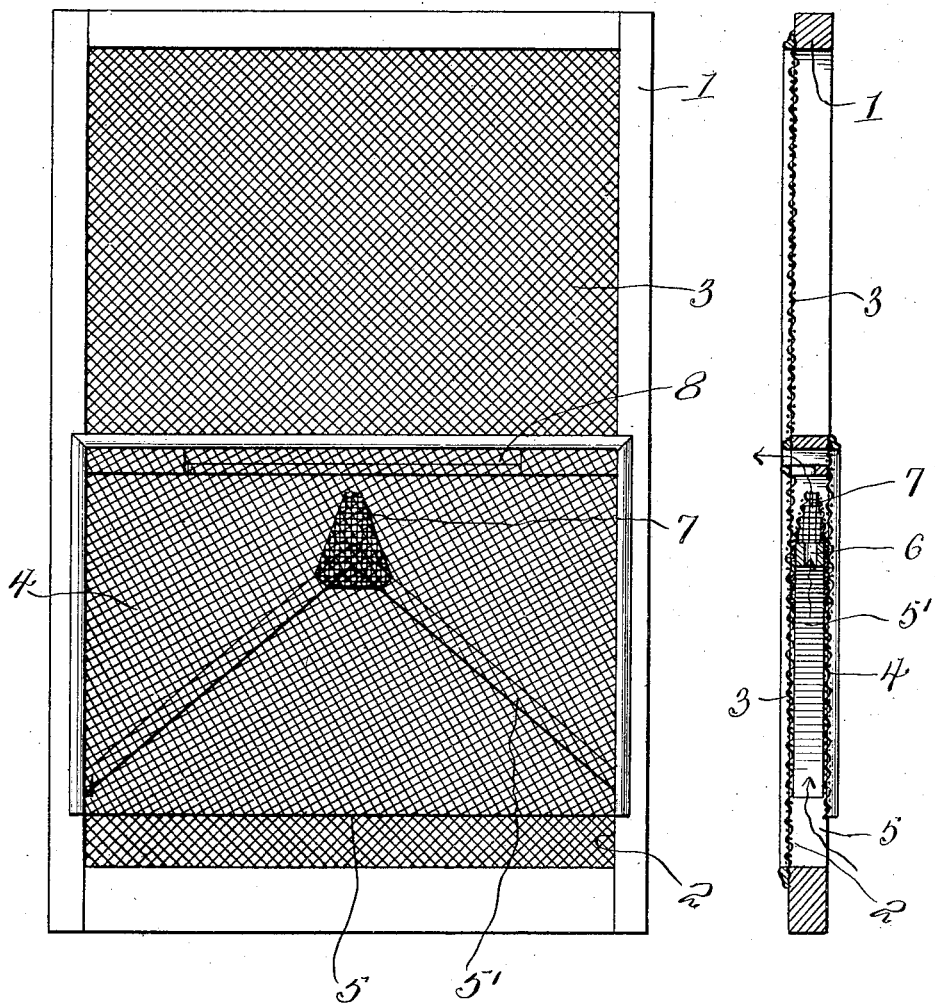

EMMETT G. THOMPSON, OF BRIGHTON, COLORADO.

FLY-SCREEN.

1,240,627.  Specification of Letters Patent.  Patented Sept. 18, 1917.

Application filed May 11, 1917.  Serial No. 167,966.

*To all whom it may concern:*

Be it known that I, EMMETT G. THOMPSON, a citizen of the United States, residing at Brighton, in the county of Adams and State of Colorado, have invented new and useful Improvements in Fly-Screens, of which the following is a specification.

My invention relates to improvements in fly screens and has for its primary object to provide a screen such as will permit flies which alight on the inside thereof to escape to the outside and to prevent any possibility of their returning by the same way; the invention consisting in the novel construction and arrangement of parts illustrated in the accompanying drawings forming a part of this specification, in which:—

Figure 1 is a front elevation of a fly screen embodying my invention,

Fig. 2 is a vertical section of the same in side elevation.

Like characters of reference indicate like parts in the various views.

In the drawings 1 designates a frame forming an inclosure 2. A screen 3 is secured thereto and extends across the inclosure. A second screen 4 is also secured upon said frame and extends across the inclosure thereof, said screen being shorter than the inclosure and an opening 5 is left at the lower end of the inclosure thereby. The screens 3 and 4 are spaced apart and an inverted V-shaped partition 5' is secured within the inclosure of the frame between the screens 3 and 4. An aperture 6 is formed at the apex of said partition and communicates that portion of the inclosure 2 which lies between the partition with that portion that lies below. A conical tube 7 is mounted on said partition above said aperture and has its apex extending upwardly. The upper end of the frame 1 has a slot 8 formed therein which leads from that portion of the inclosure 2, which lies above the partition 5', to the side of said frame opposite said short screen 4.

As is well known, when flies alight upon a vertical surface they invariably crawl upwardly, and flies alighting upon the inner side of the screen 3 will, following their natural instincts, crawl upwardly thereon, and will be guided by the partition 5' through the aperture 6 into the conical tube 7. From the conical tube 7 they will crawl out of the upper end thereof into that portion of the inclosure which lies above the partition 5'. Once a fly is in that portion of the inclosure which lies above the partition 5', it has no other means of egress, and following its natural tendency to crawl upwardly will discover the slot 8, from whence it can escape from the inclosure.

Having thus fully described my invention, I claim:—

1. In a device of the character described, the combination with a frame, of two screens secured thereto and spaced apart, one of said screens being shorter than the other and leaving an unobstructed inlet to the space between said screens at the lower end of said shorter screen, said frame having a slot formed on the upper end thereof leading from the space between said screen to the side of said frame opposite said shorter screen, and an inverted V-shaped partition in said space between said screen having the apex thereof extending upwardly and disposed centrally of the screen, said partition having an aperture at the apex thereof communicating the space above it with the space below.

2. In a device of the character described, the combination with a frame, of two screens secured thereto and spaced apart, one of said screens being shorter than the other and leaving an unobstructed inlet to the space between said screens at the lower end of said shorter screen, said frame having a slot formed on the upper end thereof leading from the space between said screen to the side of said frame opposite said shorter screen, an inverted V-shaped partition in said space between said screen having the apex thereof extending upwardly, said partition having an aperture at the apex thereof communicating the space above it with the space below, and a conical tube mounted on said partition above said hole and having its apex extending upwardly.

In testimony whereof I affix my signature.

EMMETT G. THOMPSON.